Sept. 3, 1946.   D. F. HOSMAN   2,406,769
COMBINATION COOKER AND RICER
Filed Aug. 15, 1944   2 Sheets-Sheet 1
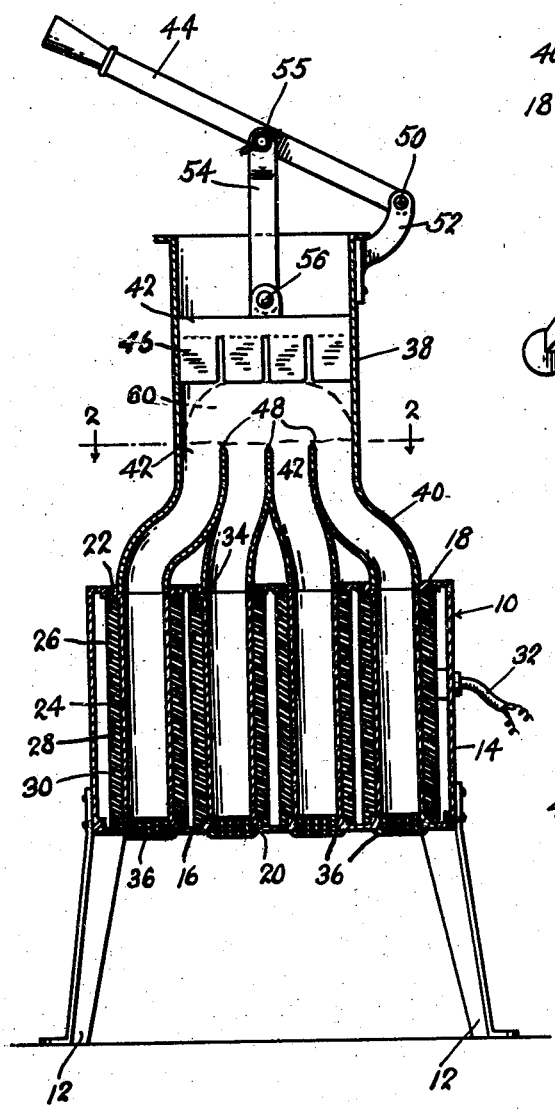
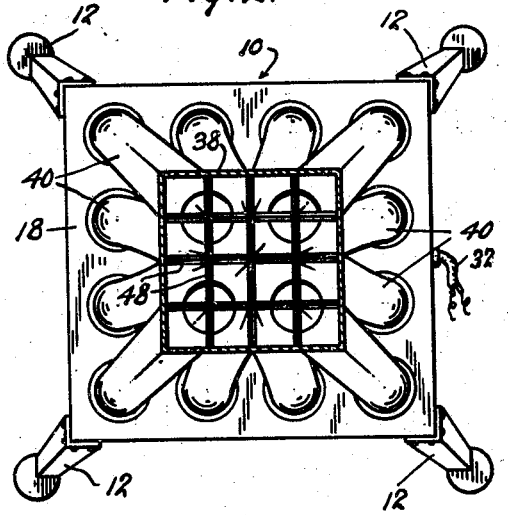
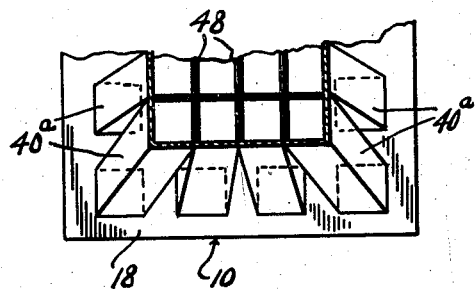
INVENTOR.
David F. Hosman
BY
Victor J. Evans & Co.
ATTORNEYS Sept. 3, 1946.　　　　D. F. HOSMAN　　　　2,406,769
COMBINATION COOKER AND RICER
Filed Aug. 15, 1944　　　　2 Sheets-Sheet 2

INVENTOR.
David F. Hosman
BY Victor J. Evans & Co.
ATTORNEYS

Patented Sept. 3, 1946

2,406,769

UNITED STATES PATENT OFFICE 2,406,769

COMBINATION COOKER AND RICER

David Fay Hosman, Omaha, Nebr.

Application August 15, 1944, Serial No. 549,612

8 Claims. (Cl. 99—353)

My invention relates to the cooking and preparation of vegetables, such as potatoes, and has among its objects and advantages the provision of an improved combination cooker and ricer.

The invention is hereinafter fully described and claimed, and illustrated in the accompanying drawings, wherein:

Figure 1 is a sectional view taken on a plane extending vertically and centrally through a combination cooker and ricer constructed in accordance with my invention;

Figure 2 is a sectional view taken in the plane indicated by the line 2—2 of Figure 1;

Figure 3 is a sectional view of a fragmentary portion of a slightly modified form of the cooker and ricer;

Figure 4:
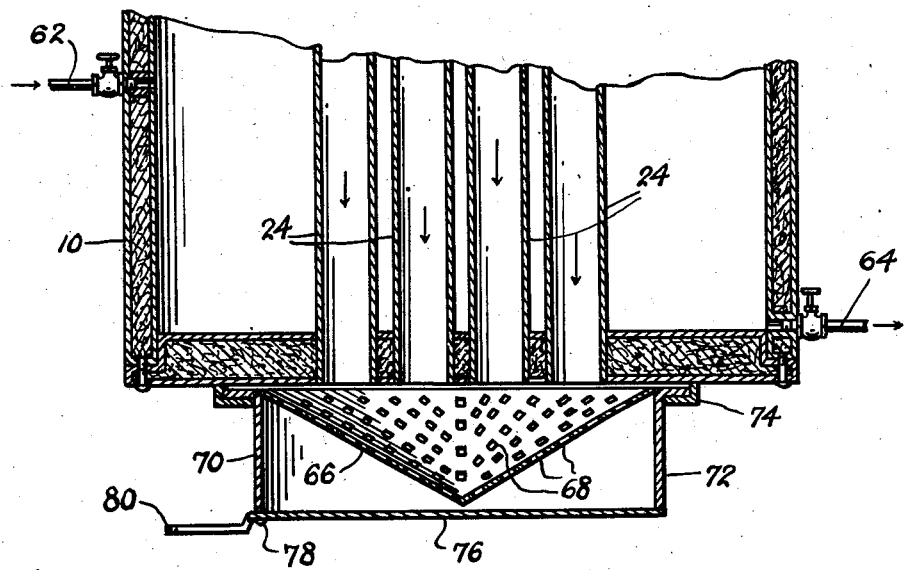
Figure 4 is a view of a modified form of my invention, and is a transverse section through the bottom part of the shell, and shows the conical ricing member and recessing hopper.

In the embodiment selected for illustration, I make use of a shell 10 mounted on legs 12. The shell 10 includes side walls 14, a bottom wall 16 and a top wall 18.

Openings 20 are provided in the bottom wall 16 and the top wall 18 is provided with openings 22. Tubes 24 have end fitting relationship with the walls of the openings 20 and 22. Sleeves 26 of insulating material, surround the tubes 24 and are provided with circumferential grooves 28 for supportingly receiving heating elements 30 electrically connected with wires 32 which may be connected with a source of current such as is supplied by an ordinary wall outlet. The tubes 24 have their upper end portions enlarged to provide shoulders 34. Perforated plugs 36 have screw threaded engagement with the lower end portions of the tubes 24.

A hopper 38 is located above the tubes 24 and communicates with the upper ends of the tubes by way of conduits 40. The conduits 40 have their upper ends preferably welded together and to the lower edges of the hopper 38, as indicated at 42. The lower ends of the conduit 40 are positioned in the enlarged upper ends of the tubes 24 and rest upon the shoulders 34 within the tubes. The conduits 40 removably support the hopper 38 in place, and they may be of circular formation in cross section, as shown in Figures 1 and 2, or of polygonal formation in cross section, as shown in Figure 3. In this figure, the conduits are designated 40ª.

The hopper 38 receives the potatoes to be cooked and riced. The potatoes are forced from the hopper 38 into the conduits 40 and then into the cooking tubes 24 by a plunger 42 which is operated through the medium of a lever 44. The plunger 42 has a free sliding fit in the hopper 38 and is provided at its lower side with relatively spaced projections 46 which enter the vertically disposed upper end portions of the conduits 40 during the final phase of the downward movement of the plunger. The upper ends of the conduits 40 are sharpened to provide knives 48 which function to sever the potatoes during the downward movement of the plunger 42. The lever 42 is provided at one end, as at 50, upon a bracket 52 secured to the hopper 38. The plunger 42 is connected to the lever 44 by a link 54 which is pivoted, as at 56, to the plunger and which is pivotally and detachably connected to the lever by a bolt and wing nut 58.

In practice, the conductors 32 are connected to a source of current to effect the heating of the tube 24 sufficiently to cook potatoes or the like. The potatoes are placed in the hopper 38, as indicated at 60, and forced therefrom into the cooking tubes 24 by the plunger 42. They are cut and distributed to the conduits 40 by the knives 48 which are of rectangular formation, as shown in Figures 2 and 3. The potatoes are cooked in their own juice and are riced as they are forced from the cooking tubes 24 through the openings of the plugs 36. The potatoes are heated to a comparatively high degree while moving through the conduits 40 into the cooking tubes or chambers 24. This apparatus provides for the convenient and efficient preparation in large quantities of riced vegetables, and is especially adapted for supplying the needs of hotels, restaurants and the like.

The legs 12 are of sufficient length to provide ample room to permit a receptacle to be placed underneath the shell 10 for receiving the riced material. At the same time, sufficient room is provided for a scraping tool which may be used to remove riced material hanging from the container outlets.

Figure 5:
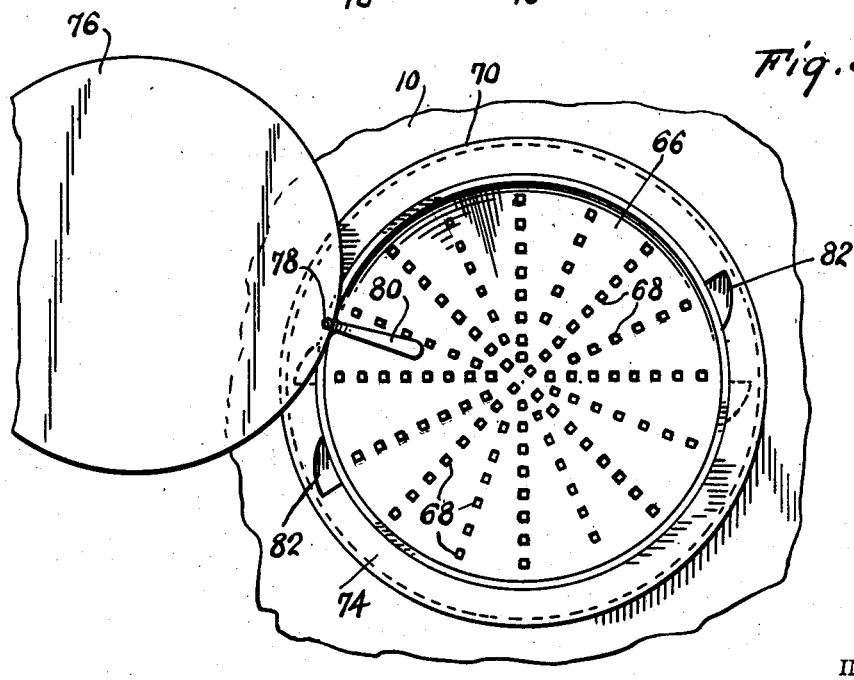
Figure 5 is a bottom plan view looking into the recessing hopper with the pivoted bottom in open position.

In the modified form of my invention of which a transverse section of the bottom part of the cooking element is illustrated in Figure 4, and a top plan view of the ricing hopper is illustrated in Figure 5, I provide means for performing the cooking operation by means of circulating steam, hot water, or hot oil, and wherein the cooking tubes lead into a common hopper or chamber having a perforated bottom part for ricing and a receiving chamber or hopper therebelow.

More specifically, I provide a hot water, oil, or steam inlet 62 and an outlet 64 the spaces between the tubes 24 being open to permit circulation of the same to cook the potatoes. Below the shell 10 is an inverted conical shaped chamber or hopper 66 into which all of the tubes 24 discharge, and which has multiple perforations 68 through which the potatoes are forced for ricing. The chamber or hopper 66 is supported upon the upper rim 70 of a receiving hopper 72, which may be cylindrical in shape, and which is attached by a collar 74 to the bottom of the shell 10. A sliding disc closure 76 pivoted at 78 to the hopper 72 forms a bottom for the hopper, and there is a handle 80 for swinging the disc 76 to an open position to remove the riced potatoes. The edge of the hopper 66 is provided with ears 82 to support the same on the hopper 72.

While I have illustrated and described specific forms in the foregoing, it is understood that changes in form, size, shape, construction, and arrangement, of parts may be made to meet varying requirements of practice provided some fall within the purview of what is claimed.

What is claimed is:

1. A machine of the character set forth, comprising a shell, cooking chambers extending vertically through the shell and having their upper ends formed to provide shoulders, means for heating the cooking chambers, a hopper located above the shell, conduits extending from the lower end of the hopper to the upper end of the cooking chambers and having their lower ends resting on the shoulders of said chambers, the upper ends of the conduits being formed to provide knives, and means for forcing the material from the hopper into contact with the knives into the conduits and through the heating chambers.

2. A machine for cooking and ricing vegetables comprising a cooking container having chambers through which the vegetables pass to be cooked, means about said chambers for heating the same, conduits positioned above said chambers having their upper edges shaped in knife like formation, a pressure element for forcing said vegetables into contact with the upper knife like edge of said conduits and through said cooking chambers, and extruding the same therefrom, and means for ricing the vegetables located below the cooking chambers, said pressure means forcing said cooked vegetables therethrough.

3. A machine for cooking and ricing vegetables comprising a shell, a plurality of straight tubes in the shell, a plurality of curved conduits having their lower ends contacting the upper ends of said tubes positioned in said shell immediately above said tubes, the upper ends of said conduits being sharpened, a pressure exerting element in the shell for forcing the vegetables through the conduits and the tubes, heating means in the shell and about the tubes for cooking the vegetables as they pass through the tubes, means for ricing the vegetables, said means being operatively associated with the tubes to receive the cooked vegetables therefrom under pressure, and means for receiving the riced vegetables.

4. The machine as described in claim 2, having a receptacle for receiving the riced vegetables including a cylindrical shell, a pivoted bottom for the shell, and a handle for moving the bottom to open the receptacle to remove accumulated riced vegetables.

5. The machine as described in claim 2, comprising a conical hopper supported beneath the cooking tubes and into which all of the tubes discharge, and multiple openings in the wall of the conical hopper through which the cooked vegetables are forced to rice the same.

6. A machine of the character set forth comprising a plurality of cooking chambers, means for heating said chambers, a hopper for the material to be cooked, means for cutting the material and distributing the cut material from the hopper through the cooking chambers, means for forcing the material through said means into and through the cooking chambers and further means for ricing the potatoes as they are discharged from the cooking chambers.

7. A machine of the character set forth comprising a plurality of cooking chambers, means for heating said chambers, a hopper for the material to be cooked, means for cutting the material and distributing the cut material from the hopper through the cooking chambers, said means comprising knives in the lower end of the hopper and conduits extending from the knives to the cooking chambers and means for forcing the material through said means into and through the cooking chambers.

8. A machine of the character set forth, comprising a plurality of cooking chambers, means for heating said chambers, a hopper for the material to be cooked, means for cutting and distributing the cut material from the hopper through the cooking chambers, said means comprising knives located in the lower end of the hopper and conduits extending from the knives to the cooking chambers and having straight upper portions and means for forcing the material through said means into and through the cooking chamber said forcing means comprising a plunger having projections on its underside adopted to enter said straight portions of the conduit.

DAVID FAY HOSMAN.